(12) United States Patent
Elliott et al.

(10) Patent No.: US 6,922,395 B1
(45) Date of Patent: Jul. 26, 2005

(54) SYSTEM AND METHOD FOR TESTING PROTOCOLS FOR AD HOC NETWORKS

(75) Inventors: Brig Barnum Elliott, Arlington, MA (US); Joseph Weinstein, Somerville, MA (US); Keith William Manning, Arlington, MA (US); William Scott Passman, Lexington, MA (US)

(73) Assignee: BBNT Solutions LLC, Cambridge, MA (US)

( * ) Notice: Subject to any disclaimer, the term of this patent is extended or adjusted under 35 U.S.C. 154(b) by 784 days.

(21) Appl. No.: 09/624,796

(22) Filed: Jul. 25, 2000

(51) Int. Cl.[7] ............................................. H04L 12/26
(52) U.S. Cl. ..................................................... 370/241
(58) Field of Search ................................ 370/241, 252, 370/277, 310, 351, 400, 428, 465, 466

(56) References Cited

U.S. PATENT DOCUMENTS

| | | | | |
|---|---|---|---|---|
| 4,977,399 A | * | 12/1990 | Price et al. ................. | 340/7.21 |
| 5,889,954 A | * | 3/1999 | Gessel et al. ................ | 709/223 |
| 5,987,011 A | | 11/1999 | Toh ............................. | 370/331 |
| 6,295,518 B1 | * | 9/2001 | McLain et al. ............... | 703/23 |
| 6,377,805 B1 | * | 4/2002 | Anvekar et al. ............. | 455/436 |
| 6,385,174 B1 | * | 5/2002 | Li ................................ | 370/252 |
| 6,483,811 B1 | * | 11/2002 | Jabbarnezhad .............. | 370/250 |

OTHER PUBLICATIONS

Schult et al, "Routing in mobile ad hoc networks", 1999, Military Communications Conference Proceedings, 1999. MILCOM 1999. IEEE, vol. 1, p. 10–14.*

KubinsZky et al, "Emulation of ad–hoc networks on IEEE 802.11", 2000, Microwaves, Rada and Wireless Communications, vol. 2, p. 447–450.*

Racheria et al, "MAdSim–a simulation environment for ad–hoc mobile networks", Dec. 1997, Personal Wireless Communications, 1997 IEEE International Conference, IEEE Catalog No. 97TH8338, p. 357–360.*

* cited by examiner

*Primary Examiner*—Chi Pham
*Assistant Examiner*—Derrick W Ferris
(74) *Attorney, Agent, or Firm*—Ropes & Gray LLP (57) ABSTRACT

A system tests the protocols for a network containing a group of network devices. The system includes a simulation controller (110) that transmits network configuration information during the protocol testing and one or more nodes (135-1 to 135-N) that emulate a network device, receive the network configuration information from the simulation controller (110), and perform one or more operations in response thereto. The system also includes an analysis device (140) that monitors and analyzes the nodes (135-1 to 135-N) during the protocol testing.

27 Claims, 7 Drawing Sheets

FIG. 6B

SYSTEM AND METHOD FOR TESTING PROTOCOLS FOR AD HOC NETWORKS

GOVERNMENT CONTRACT

The U.S. Government has a paid-up license in this invention and the right in limited circumstances to require the patent owner to license others on reasonable terms as provided for by the terms of Contract No. DAAB07-96-C-C760 awarded by the U.S. Army.

FIELD OF THE INVENTION

The present invention relates generally to communication systems and, more particularly, to a system and method for testing protocols for ad hoc networks.

BACKGROUND OF THE INVENTION

The popularity of ad hoc networks has increased dramatically in recent years. In an ad hoc network, network devices communicate with each other over a wireless medium without the need for infra-structured (wired) network component support. In an ad hoc network, each network device acts as a router in order to forward information to their appropriate destination(s). In order to efficiently route information in an ad hoc network, an appropriate networking protocol must be selected that has the ability to adapt well to link changes (i.e., changes in the interconnectivity between network devices due to network device migration).

Three conventional approaches to determining an appropriate ad hoc networking protocol include: field experiments in an actual ad hoc network, computer-simulated modeling, and the use of actual ad hoc networking equipment on a controlled radio (RF) channel. The first approach involves the use of field experiments (e.g., deployment of a wireless ad hoc network into an actual environment) to determine an appropriate networking protocol. Using this technique, however, it is difficult to perform controlled and repeatable experiments.

The second technique uses computer-simulated models of network nodes and communications channel behavior, often called discrete event simulation. This technique has two drawbacks. First, the models often run much more slowly than the real time required for the real situation being modeled. The modeling times involved can be so long as to rule out, or make difficult, thorough testing of the protocols, especially for large networks. Second, the models are usually simplified variants of the real implementations of the networking protocols, communications equipment, and channel conditions. These simplifications can introduce significant errors in the results.

The third technique uses actual ad hoc networking equipment on a controlled radio frequency (RF) channel, e.g., placing a number of RF wireless network nodes on a shared system of coaxial cables. This technique has two drawbacks. First, the shared system of coaxial cables is typically expensive. Second, it is not very flexible. Such a system makes it difficult to simulate a wide variety of channel conditions without recabling or other relatively time-consuming operations.

Therefore, there exists a need for a system and method that quickly, repeatably, and accurately test ad hoc networking protocols.

SUMMARY OF THE INVENTION

Systems and methods consistent with the present invention address this need by providing a mechanism for testing ad hoc networking protocols in a fast, repeatable, and accurate manner.

In accordance with the purpose of the invention as embodied and broadly described herein, a system for testing protocols for an ad hoc network containing a group of network devices includes a simulation controller that transmits network configuration information during the protocol testing and one or more nodes that emulate a network device, receive the network configuration information from the simulation controller, and perform one or more operations in response thereto. The system further includes an analysis device that monitors and analyzes the nodes during the protocol testing.

In a further implementation consistent with the present invention, a method includes selecting protocol configuration settings to be tested, establishing the protocol configuration settings in each of one or more nodes, each node configured to emulate at least one of a group of actual communication devices, simulating operation of the network, monitoring the operation, and analyzing the monitoring to determine protocol suitability.

In yet a further implementation consistent with the present invention, a computer-readable medium, containing instructions for controlling at least one processor to perform a method that tests protocols for a network having a group of communication devices, includes establishing protocol configuration settings in each of one or more nodes, each node configured to emulate at least one of the group of communication devices, simulating operation of the network, monitoring the operation, and analyzing the monitoring to determine protocol suitability.

In another implementation consistent with the present invention, a system for testing protocols for an ad hoc network having a group of ad hoc devices includes a group of nodes, each node configured to emulate at least one of the ad hoc devices, generate and receive traffic, and simulate transmission characteristics, and an analysis device configured to monitor the testing, collect test information, and analyze the test information.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Implementations consistent with the present invention provide a novel way to test the networking protocols used in ad hoc networks. While the present invention is particularly useful for ad hoc wireless networks, it applies to all forms of ad hoc networks. A system and method consistent with the present invention allow network protocols to be systematically tested under a variety of conditions, in a controlled and repeatable fashion, with the simulation running as fast as or faster than the network would run in actual operation.

The system and method further allow quantitative results to be extracted from these experiments for later analysis. Such controlled and repeatable experiments allow protocol designers, or persons adjusting the operational parameters for protocols, to optimize their protocols based on well-understood, quantitative measurements of the behavior of these protocols in a variety of conditions. As will be apparent from the foregoing description, a system, consistent with the present invention, may be built using cheap and readily available commercial computers and networking components.

EXEMPLARY SYSTEM

Figure 1:
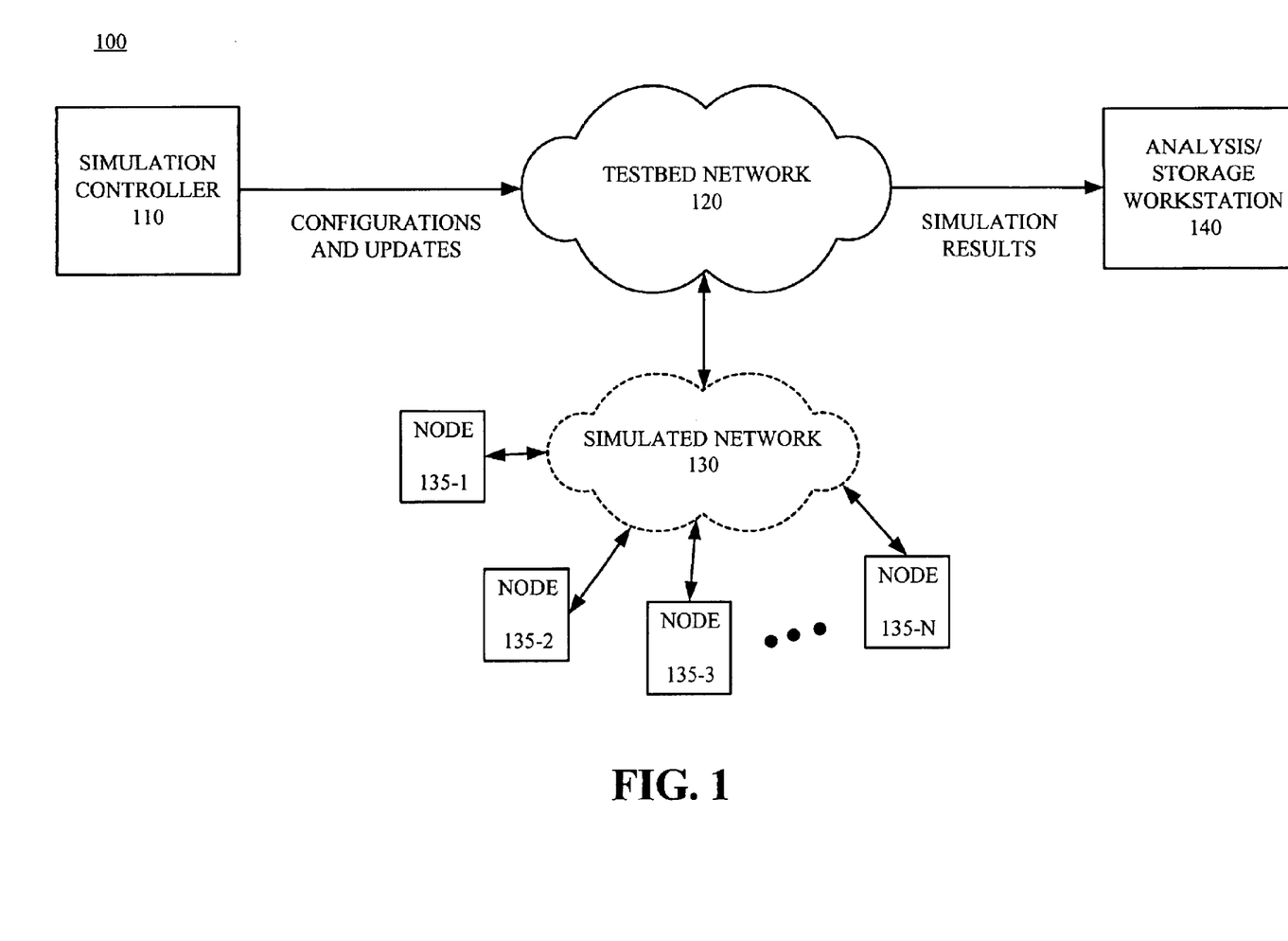
FIG. 1 illustrates an exemplary system consistent with the present invention for testing protocols for ad hoc networks.

FIG. 1 illustrates an exemplary system 100 consistent with the present invention for testing protocols for ad hoc networks. The system 100 includes a simulation controller 110, a testbed network 120, a simulated network 130 having a group of nodes 135-1 to 135-N connected thereto, and an analysis and storage workstation 140.

The simulation controller 110 includes one or more computers that act as the stimulus to the simulated network 130. The simulation controller 110 uses such information as terrain data, trajectory sets, and traffic control models to determine a complete set of inputs for an experiment or test. The terrain data, trajectory sets, and traffic control models together describe the initial placement (i.e., layout) of network nodes on a geographic terrain, the wireless communication channel characteristics between these nodes, in so far as these characteristics depend entirely on geographic placement, and the traffic flows that these network nodes will send to each other.

The simulation controller 110 combines these three input items to derive initial configuration information for the devices under test (i.e., the nodes 135-1 to 135-N in the simulated network 130), and to derive control information that is distributed to these nodes 135-1 to 135-N as the experiment or test takes place. During the experiment, the simulation controller 110 periodically broadcasts a "Channel Characteristic Matrix" onto the testbed network 120. This matrix represents the current pair-wise state of the communications channel characteristics between all pairs of nodes in the simulated network 130. The simulation controller 110 formulates a series of these characteristic matrices, representing the changing channel characteristics as nodes move through the simulated terrain, as jamming occurs, and so forth. The simulation controller 110 broadcasts these matrices onto the testbed network 120 so the individual nodes 135-1 to 135-N in the simulated network 130 can properly simulate the ad hoc network's changing transmission characteristics.

Figure 2:
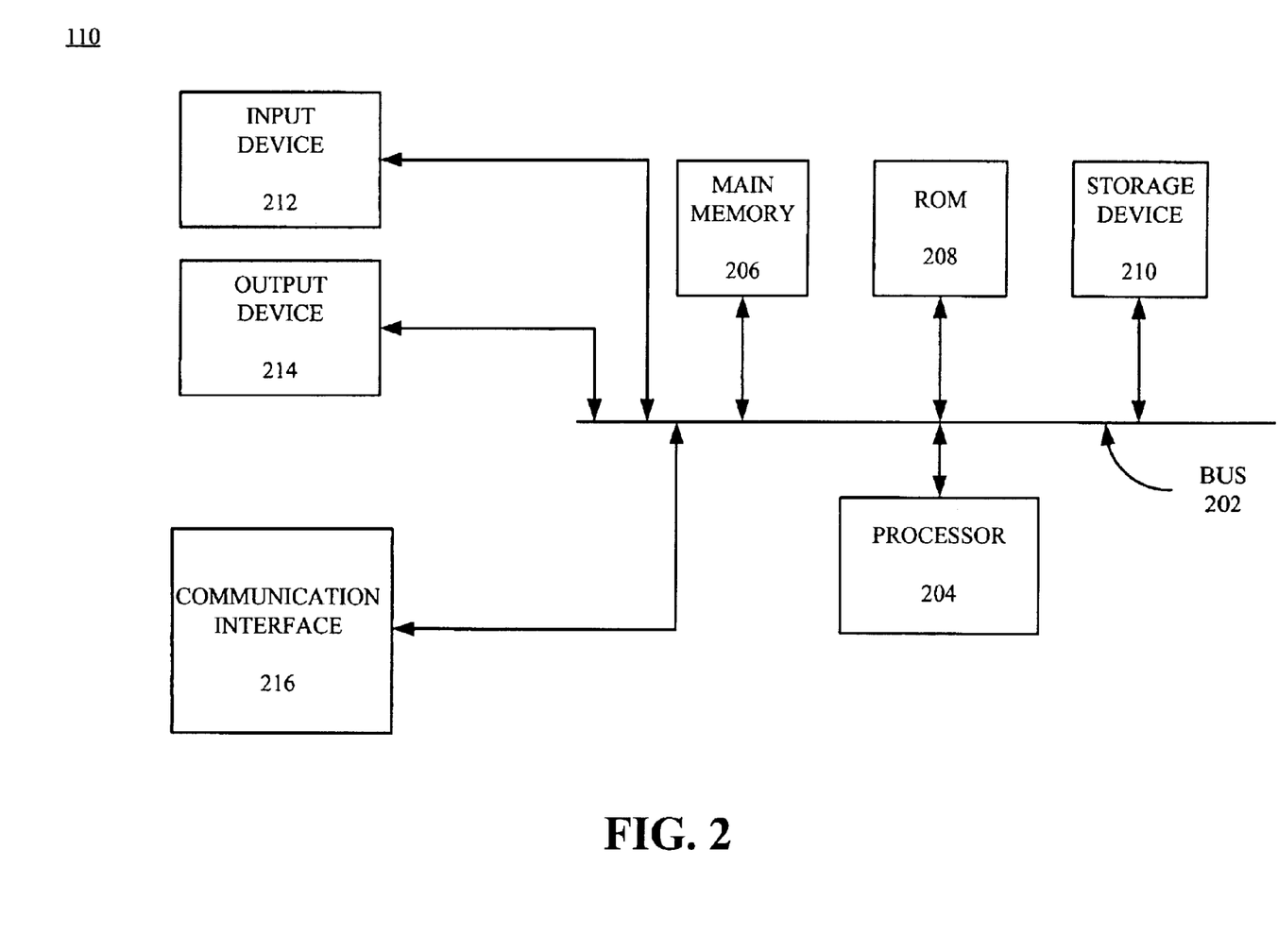
FIG. 2 illustrates an exemplary simulation controller consistent with the present invention.

FIG. 2 illustrates an exemplary simulation controller 110 consistent with the present invention. In FIG. 2, the simulation controller 110 includes a bus 202, a processor 204, a main memory 206, a read only memory (ROM) 208, a storage device 210, an input device 212, an output device 214, and a communication interface 216. The bus 202 permits communication among the components of the simulation controller 110.

The processor 204 may include any type of conventional processor or microprocessor that interprets and executes instructions. The main memory 206 may include a random access memory (RAM) or another type of dynamic storage device that stores information and instructions for execution by the processor 204. Main memory 206 may also be used to store temporary variables or other intermediate information during execution of instructions by processor 204.

ROM 208 may include a conventional ROM device and/or another type of static storage device that stores static information and instructions for processor 204. The storage device 210 may include a magnetic disk or optical disk and its corresponding drive and/or some other type of magnetic or optical recording medium and its corresponding drive for storing information and/or instructions.

The input device 212 may include any conventional mechanism that permits an operator to input information to the simulation controller 110, such as a keyboard, a mouse, a pen, voice recognition and/or biometric mechanisms, etc. The output device 214 may include any conventional mechanism that outputs information to the operator, including a display, a printer, a pair of speakers, etc.

The communication interface 216 may include any transceiver-like mechanism that enables the simulation controller 110 to communicate with other devices and/or systems, such as nodes 135-1 to 135-N. For example, the communication interface 216 may include a modem or an Ethernet interface to a network. Alternatively, communication interface 216 may include other mechanisms for communicating via a network, such as network 120.

The simulation controller 110 controls the testing of ad hoc network protocols in response to processor 204 executing sequences of instructions contained in a computer-readable medium. A computer-readable medium may include one or more memory devices or carrier waves, such as memory 206 or storage device 210. Execution of the sequences of instructions causes processor 204 to perform process steps that will be described hereafter. In alternative embodiments, hard-wired circuitry may be used in place of or in combination with software instructions to implement the present invention. Thus, the present invention is not limited to any specific combination of hardware circuitry and software.

A simulation controller 110, consistent with the present invention, may be associated with a database that stores the terrain data, trajectory sets, and traffic control models for use in ad hoc protocol testing. The database may be contained within main memory 206, storage device 210, or may be located external to the simulation controller 110.

Figure 3:
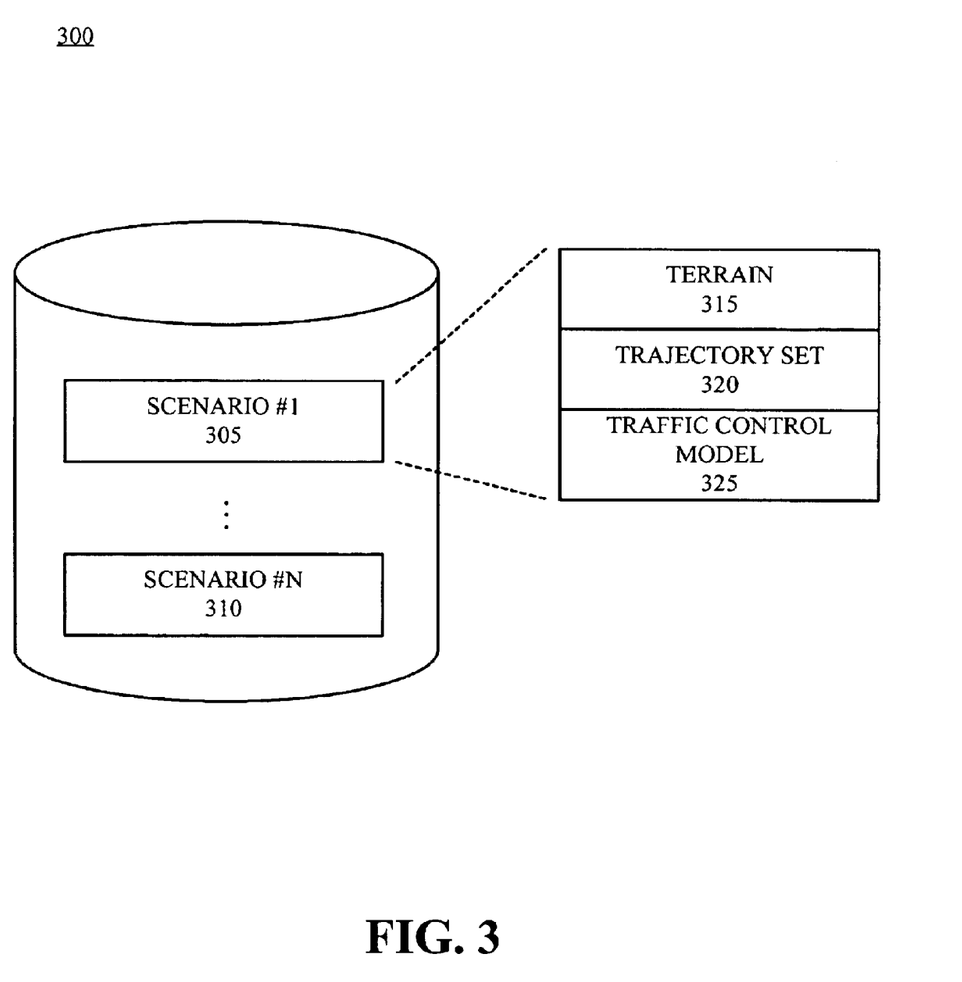
FIG. 3 illustrates an exemplary database configuration consistent with the present invention.

FIG. 3 illustrates an exemplary database 300 configuration consistent with the present invention. In FIG. 3, the database 300 includes a group of scenario fields 305–310. Each scenario describes the parameters of a given test or experiment. Each scenario field 305–310 includes a number of subfields: a terrain subfield 315, a trajectory set subfield 320, and a traffic control model subfield 325. While only three subfields are illustrated, it will be appreciated that scenario fields 305–310 may include additional or different subfields that contain information that may be needed for properly characterizing a given experiment.

The terrain subfield 315 includes information regarding a particular geographic area and the "pathloss" or communications channel capability for pairs of nodes placed on this terrain. For example, a particular terrain may be a digital form of a geographic contour map together with RF pathloss estimates between any pairs of regions on this map. That is, for two locations (x1,y1,z1) and (x2,y2,z2) on this contour map, the terrain information may include an associated pathloss value P1 that indicates how well a signal transmitted at one location would be received at the other. Alternatively, the terrain information may include two such pathloss values (P1 and P2), one for transmissions from the first point to the second, and the other for transmissions in the reverse direction. Since it is likely to be prohibitively difficult to maintain pathloss information for every pair of points, the terrain subfield 315 may break down the map into subregions (e.g., rectangular sub-grids) and give the pathloss (es) between pairs of subregions rather than between points.

The terrain subfield 315 may also include such information as outdoor characteristics, in-building characteristics, sub-sea characteristics, free-space or extra-terrestrial characteristics, or any other characteristics of nodes placed in the physical universe. The terrain subfield 315 may even specify characteristics that are not representative of the physical universe, such as propagation laws that do not correspond to the laws of physics. Terrain information, thus, represents the communications channel characteristics for two network nodes at arbitrary spatial locations, without consideration of non-terrain characteristics, such as interference from other radio sources.

The trajectory set subfield 320 includes information describing the initial placement of a number of nodes on a terrain and their subsequent movements (i.e., locations) over time. Nodes may be added or removed from this set as time elapses. For instance, a particular trajectory set subfield 320 may begin with the initial position for N nodes, contain their locations over some period of time, introduce M new nodes at specified times along with their trajectories, and also indicate that some number D of these nodes have ceased operation and hence are no longer in the trajectory set. The locations within trajectory set subfield 320 are given in such a format so that they can be readily matched onto a given terrain in terrain subfield 315. For example, the locations may be geo-coded with absolute terrain coordinates for the world. As another example, the locations may be relatively geo-coded, meaning that they contain accurate locations relative to some reference point. It will be appreciated that any number of representations for a particular trajectory set may alternatively be used.

The traffic control model subfield 325 stores information regarding the types of traffic that will flow through the network, with appropriate annotations for each flow. Such annotations may include, for example, the start time, the type of traffic flow, the node that is the source of the traffic, nodes that are the destinations of the traffic, and so forth. In essence, a traffic control model acts as a script for the nodes. It tells them when to begin generating traffic, when to expect to receive traffic, and so forth. The traffic control models are described in such a way that the node identifiers can be correlated with those nodes in a trajectory set in trajectory set subfield 320. Thus, taking information from the two subfields 320 and 325 together, one can determine both the trajectory of a given node and its traffic characteristics. It will be appreciated that any number of different techniques may be used to characterize traffic. In particular, a traffic control model may contain indications of higher-level application program control (e.g., fetch a web page from a specified server) as well as lower-level protocol descriptions (e.g., send 100 User Datagram Protocol (UDP) datagrams to a specified destination node).

Returning to FIG. 1, the testbed network 120 includes a network that permits routing of information between the simulation controller 110, the nodes 135-1 to 135-N of the simulation network 130, and the analysis and storage workstation 140. The testbed network 120 may be a local-area network (e.g., an Ethernet network) or may be dispersed over a wider geographic area, such as a wide-area asynchronous transfer mode (ATM) network.

The simulated network 130 may include any type of network that permits routing of information to/from the nodes 135-1 to 135-N attached thereto. The nodes 135-1 to 135-N may include computers, specialized equipment, or actual versions of the hardware used in an actual ad hoc network. Each node 135-1 to 135-N is capable of finding the other nodes, determining paths through the network 130 for data traffic from source to destination(s), and detecting and repairing ruptures in the network 130 as nodes move, as they fail, as battery power changes, as communication path characteristics change over time, etc.

Figure 4:
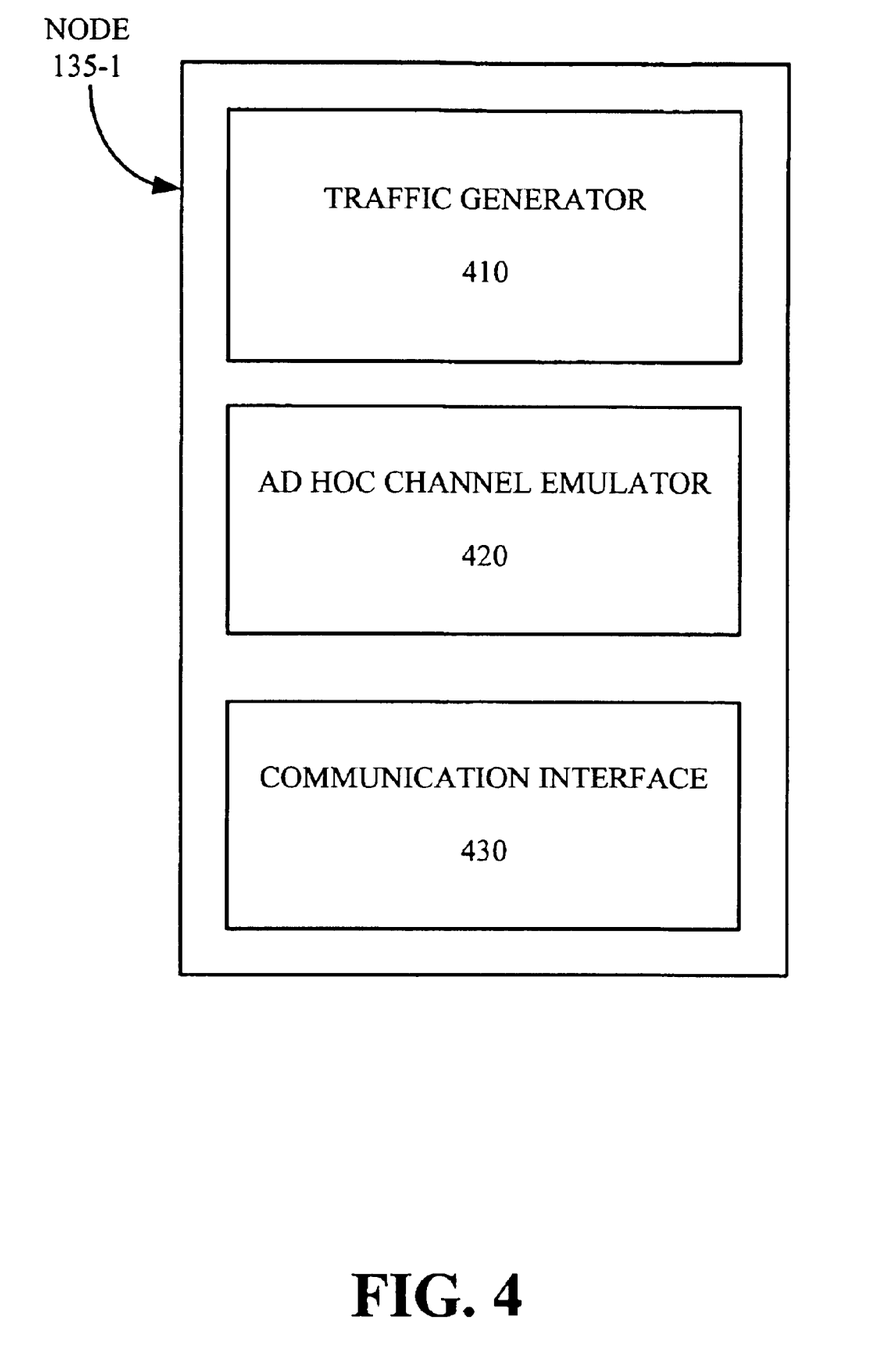
FIG. 4 illustrates an exemplary node consistent with the present invention.

A given node 135-1 to 135-N may simulate one or multiple devices in the actual ad hoc network or may emulate or instantiate only a subset of the capabilities of an actual device. In an implementation consistent with the present invention, each node 135-1 to 135-N contains the actual software for all the protocols and application programs resident in an actual network device. This ensures that the experiment or test will give results that closely resemble results that would occur in field trials. Each node 135-1 to 135-N contains a traffic generator, an ad hoc channel emulator, and a communication interface. FIG. 4 illustrates an exemplary node (e.g., node 135-1) consistent with the present invention.

In FIG. 4, the node 135-1 includes a traffic generator component 410, an ad hoc channel emulator component 420, and a communication interface component 430. The traffic generator 410 acts as a source or sink of traffic through the simulated network 130. The traffic generator 410 acts in response to a script downloaded from the simulation controller 110, stimuli from the simulation controller 110 as the experiment unfolds, and/or other events in the network 130. The script may contain information, such as a list of starting times and traffic that should be sent at that time, or traffic that should be expected at that time. Once the experiment begins the traffic generator 410 executes this script and takes the appropriate actions in response thereto.

In addition, the simulation controller 110 may provide stimuli during the course of the experiment. These stimuli may provide modifications or extensions to a script that is already executing, or provide a list of actions in the absence of a script. In addition, the traffic generator 410 may use other activities in the simulated network 130 as inputs that help govern its actions. For example, its protocols may alter their rate of transmission based on the experienced round-trip time (RTT) for protocols through the simulated network 130. As another example, the traffic generator 410 may notice the presence or absence of other nodes in the simulated network 130 and modify its behavior accordingly.

In general, the traffic generator 410 may have all the aspects of one or more full application programs, such as web servers or clients, distributed databases, name servers or clients, or other application programs, whether widely-used or customized for a specific task. In fact, the traffic generator 410 may include the actual application programs (e.g., web servers) and network-level protocols (e.g., transmission control protocol (TCP) that will be used in the actual ad hoc network, so that their loads on the network and reactions to the network's simulated behavior can precisely model the behavior of actual application programs in the network.

The ad hoc channel emulator component 420 includes a specialized software entity that makes the testbed network 120 appear to have the actual transmission characteristics of the communications medium that is being modeled. It may be implemented as a "shim" between the device driver for the testbed network 120 and the upper layers of the protocol stack in the node 135-1, or by using other convenient mechanisms. It will be appreciated that a "shim" is a go-between between two software modules (e.g., modules A and B), where there is a defined interface between A and B. The "shim" software is inserted so that the modules look like A-shim-B instead of A-B. The shim's role is to perform some adaptation function while still preserving the old interface between modules. According to an exemplary implementation, the "shim" keeps the same calling interface between the upper half of a network device driver (A) and the lower half (B) but adapts the functionality by interposing simulations of RF pathloss, additional delay, and so forth.

For example, assume that the testbed network 120 is an Ethernet network. The ad hoc channel emulator 420 may make the Ethernet network emulate the transmission characteristics of a wireless RF medium in order to simulate a wireless ad hoc network. Although every node in an Ethernet network can transmit to and receive from every other node, this characteristic is not in general true of wireless ad hoc networks, in which some nodes may be out of transmission range of other nodes. Hence, for such channels, the ad hoc channel emulator 420 selectively accepts or discards packets. That is, it accepts a packet if it determines that the device sending the packet is "within range" and discards it otherwise. This calculation is based on the current communications channel information (Channel Characteristic Matrix) between these two nodes. The ad hoc channel emulator 420 learns this information from broadcasts from the simulation controller 110.

In the real world, as a node moves in an ad hoc network, its communications links to other nodes change accordingly. This effect is simulated by the ad hoc channel emulator 420 as it receives updated channel characteristic matrix broadcasts from the simulation controller 110. It will be appreciated that the channel characteristic matrix can contain a wide variety of information, such as the degradation in signal strength in decibels, the probability of correct reception of a packet or sequence of bits, the current parameters for fading, etc. Moreover, this matrix can be encoded and transmitted in a wide variety of forms. For example, the matrix may be encoded and transmitted as a square matrix of floating point numbers, as a triangular matrix of integers, as varying-length lists, as a series of changes to the previous matrices, and so forth. The ad hoc channel emulator 420 is capable of using these parameters as input and simulating the transmission channel accordingly.

Another important aspect of the ad hoc channel emulator 420 is that it matches speed between the actual testbed network 120 and the simulated network's 130 transmission medium. For example, the testbed network 120 may be implemented as a 100 Mbps Ethernet network, while the simulated network 130 may employ 100 Kbps wireless channels. In such a situation, the ad hoc channel emulator 420 inserts appropriate delays into a sequence of transmitted and/or received packets so as to ensure that the aggregate data rate for packets that are sent or received through the ad hoc channel emulator 420 do not exceed the simulated channel capacity (100 Kbps in this example).

A further important aspect of the ad hoc channel emulator 420 is that it models contention and collisions on the simulated communications medium. Although the actual testbed network 120 will not have such contention characteristics or collisions, an ad hoc channel emulator 420 can compute when such effects would have occurred on the simulated medium and disrupt packet contents and/or discard packets accordingly. It will be appreciated that many different versions of ad hoc channel emulators exist that may be used to make the underlying testbed network 120 accurately mimic various types of communications media with time-varying characteristics and in which inter-node connectivity changes over time. Implementations consistent with the present invention may use one or more of these existing ad hoc channel emulators.

The communication interface 430 includes any transceiver-like mechanism that enables the node 135-1 to communicate with other devices and/or systems, such as simulation controller 110, via a wired, wireless, or optical connection. For example, the communication interface 430 may include a modem or an Ethernet interface to a network. Alternatively, communication interface 430 may include other mechanisms for communicating via a network, such as network 130.

Returning to FIG. 1, the analysis and storage workstation 140 includes one or more computers, workstations, personal digital assistants (PDAs), and the like capable of capturing and analyzing the results of the experiment or test. The analysis and storage workstation 140 may, for example, capture an indication of the experimental setup (date, time, the scenario components used in this experiment, and perhaps identifiers for versions of the protocols being tested or their configuration settings). It may also capture any or all of the datagrams that are exchanged on the testbed network 120 during the course of the experiment or test, i.e., capture some or all of the "trace" of the network traffic.

After the experiment ends, the analysis and storage workstation 140 may also collect information from the nodes 135-1 to 135-N under test. This information may include routine management information, e.g., collected via the Simple Network Management Protocol or other mechanisms. It may further include measurements or events captured by the traffic generator 410 or other application programs on the nodes 135-1 to 135-N. The analysis and storage workstation captures sufficient information so that (a) aggregate network performance can be computed, (b) flaws in network protocols can be discovered and analyzed, and (c) specific areas of interest such as throughput, delay, channel utilization, and so forth, can be captured and analyzed.

Figure 5:
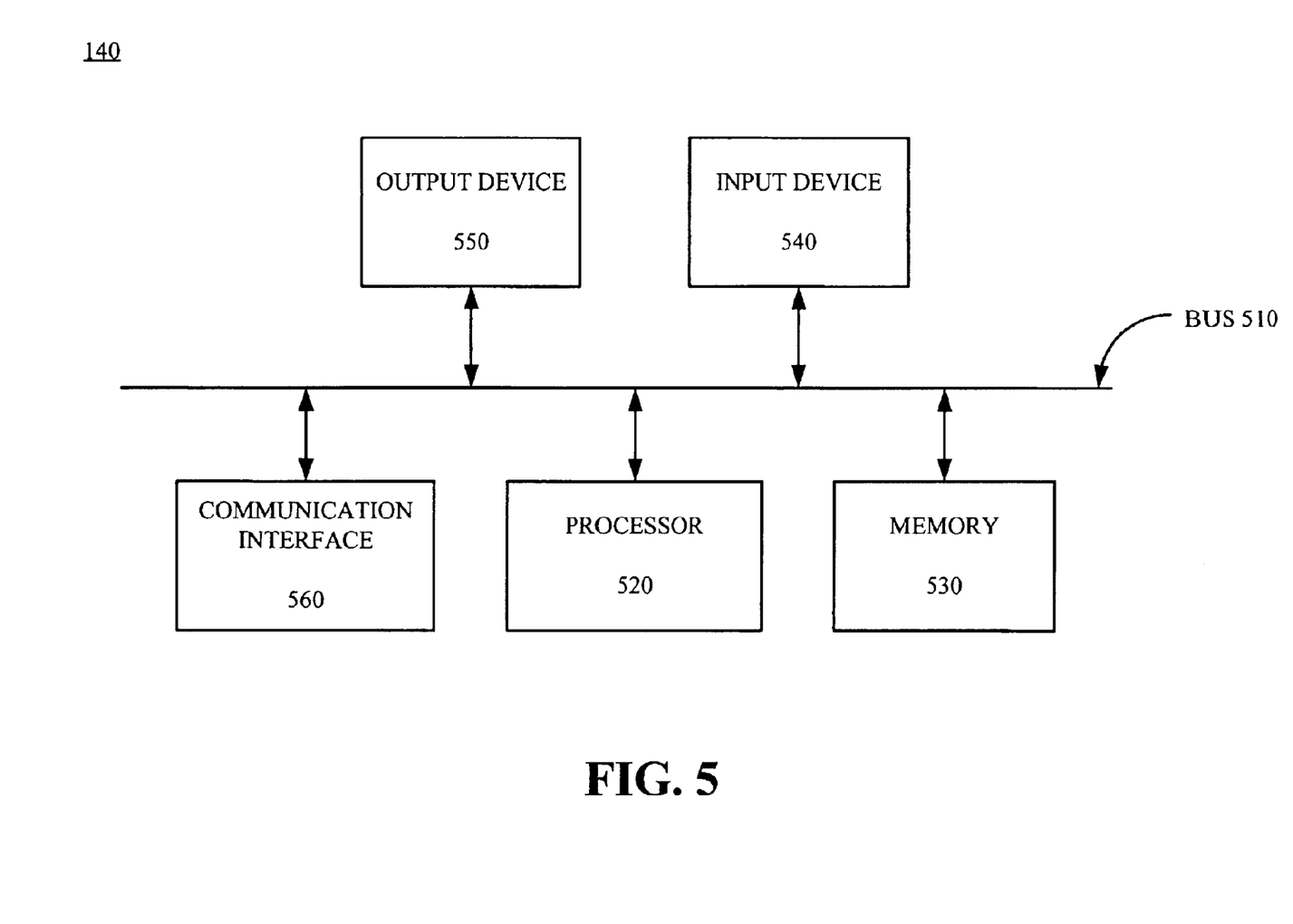
FIG. 5 illustrates an exemplary analysis and storage workstation consistent with the present invention.

FIG. 5 illustrates an exemplary analysis and storage workstation 140 consistent with the present invention. The analysis and storage workstation 140 includes a bus 510, a processor 520, a memory 530, an input device 540, an output device 550, and a communication interface 560. The bus 510 permits communication among the components of the analysis and storage workstation 140.

The processor 520 may include any type of conventional processor or microprocessor that interprets and executes instructions. The memory 530 may include a RAM or another type of dynamic storage device that stores information and instructions for execution by the processor 520; a ROM or another type of static storage device that stores static information and instructions for use by the processor 520; and/or some type of magnetic or optical recording medium and its corresponding drive.

The input device 540 may include any conventional mechanism that permits an operator to input information to the analysis and storage workstation 140, such as a keyboard, a mouse, a pen, voice recognition and/or biometric mechanisms, and the like. The output device 550 may include any conventional mechanism that outputs information to the operator, including a display, a printer, a pair of speakers, etc. The communication interface 560 may include any transceiver-like mechanism that enables the analysis and storage workstation 140 to communicate with other devices and/or systems, such as testbed network 120, via a wired, wireless, or optical connection.

Execution of the sequences of instructions contained in a computer-readable medium, such as memory 530, causes processor 520 to perform the functions described below. In alternative embodiments, hard-wired circuitry may be used in place of or in combination with software instructions to implement the present invention. Thus, the present invention is not limited to any specific combination of hardware circuitry and software.

EXEMPLARY PROCESS

Figure 6A:
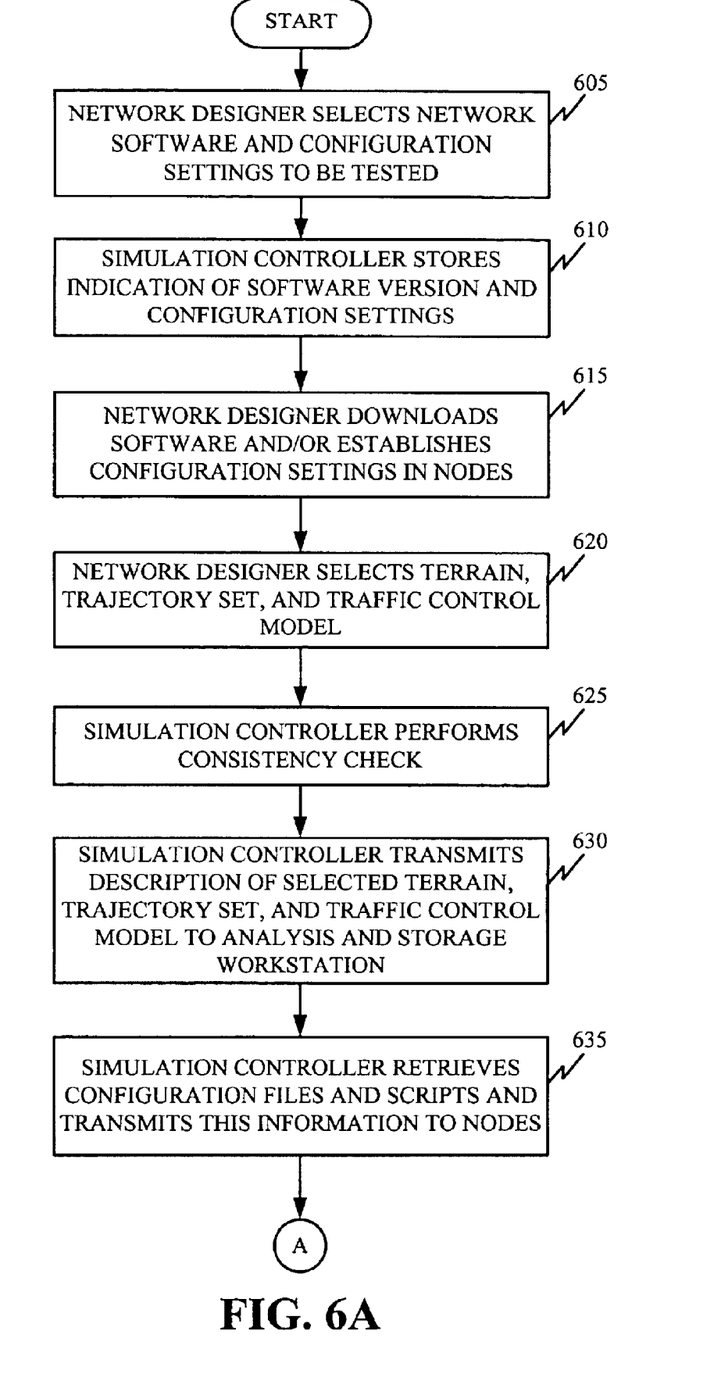
FIGS. 6A and 6B illustrate an exemplary process, consistent with the present invention, for testing protocols for an ad hoc network.
Figure 6B:
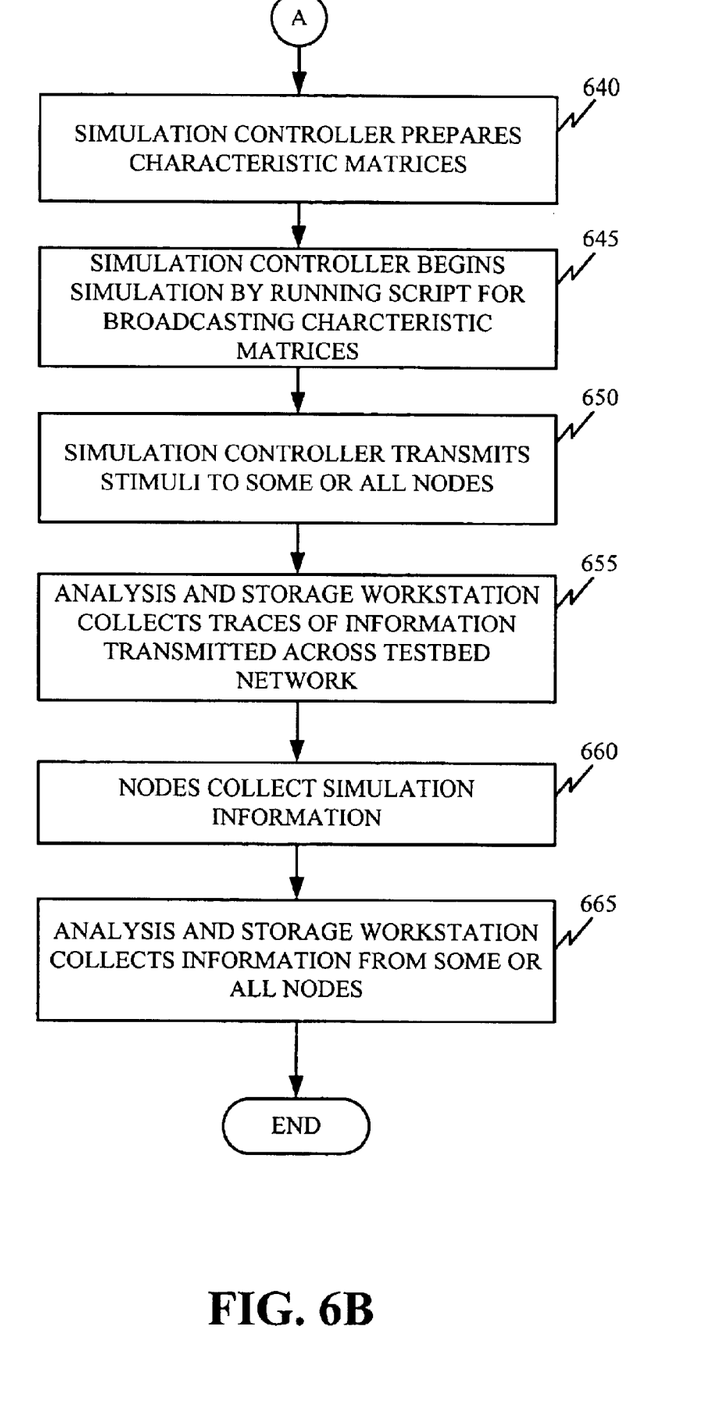

FIGS. 6A and 6B illustrate an exemplary process, consistent with the present invention, for testing protocols for an ad hoc network. The process begins with an operator, such as a network or protocol designer, selecting the particular network software and configuration settings to be tested [step 605] (FIG. 6A). This selection may be made, for example, by selecting from a list of software versions and configuration settings at simulation controller 110. Once selected, the network designer may record the software versions and configuration settings in a file on the simulation controller 110 so they can be properly recorded as part of the experimental results [step 610]. This record may be stored, for example, in main memory 206 or on storage device 210.

The network designer downloads the selected software and/or establishes the configuration settings in the devices to be tested (i.e., nodes 135-1 to 135-N) [step 615]. This download process may be accomplished through the use of the simulation controller 110. For example, the simulation controller 110 may transfer the selected software and configuration settings to the appropriate nodes 135-1 to 135-N via the testbed network 120. Alternatively, the software and configuration settings may be manually loaded into each node 135-1 to 135-N.

The network designer selects one or more terrain 315, trajectory set 320, and traffic control model 325 from the assortment of scenarios 305–310 stored on the simulation controller 110 or elsewhere [step 620]. Upon selection of a particular terrain 315, trajectory set 320, and traffic control model 325, the simulation controller 110 performs a consistency check on this selected information to ensure compatibility (e.g., to ensure that the geo-locations match, number of nodes match, and so forth) [step 625]. The simulation controller 110 then transmits a description of the selected information (i.e., the terrain 315, trajectory set 320, and traffic control model 325) to the analysis and storage workstation 140 so that they form a part of the record for this experiment [step 630]. The analysis and storage workstation 140 may, for example, store the description locally in memory 530 or in a storage device external to the workstation 140.

Once the software and configuration settings have been selected and downloaded and a terrain 315, trajectory set 320, and traffic control model 325 have been selected, the simulation controller 110 creates and/or retrieves any configuration files and/or scripts that will be used in the nodes 135-1 to 135-N and transmits these files and scripts to the nodes 135-1 to 135-N over the testbed network 120 [step 635]. The simulation controller 110 may use, for example, a standardized file transfer protocol for transferring this information, or any other conventional technique.

Once the nodes 135-1 to 135-N have received the configuration files and scripts, they are ready for the start of the simulation. The simulation controller 110 may prepare, prior to the actual start of the simulation, a series of channel characteristic matrices that it will broadcast into the testbed network 120 to the ad hoc channel emulators 420 of the nodes 135-1 to 135-N to be tested [step 640] (FIG. 6B). The simulation controller 110 may calculate these matrices by comparing the node trajectories to the selected terrain and computing pair-wise transmission characteristics. In addition, the simulation controller 110 may alter or replace these characteristics with other computed values that represent the effects of radio interference, jamming, time-varying fades in the channel, and other channel-specific features. When it has computed these matrices, the simulation controller is ready for the start of the simulation.

The simulation controller 110 begins the simulation by running a script that indicates when it should broadcast the next channel characteristic matrix onto the testbed network 120 [step 645]. Such broadcasts may be periodic, or occur only when needed in order to simulate a given change in the communications channel for one or more nodes. The broadcasts may contain a simulated clock time value so that all nodes can maintain a simulated time with relatively close synchronization. This is desirable when analyzing the collected data, as it makes it easier to correlate events from distributed nodes. The simulated time may run at real-time "wall clock" speed, faster than real-time speed, or slower.

During the course of the simulation, the simulation controller 110 may also send additional stimuli to some or all of the nodes 135-1 to 135-N being tested [step 650]. These stimuli may contain instructions that cause the devices being simulated by nodes 135-1 to 135-N to cease operation, malfunction, begin erroneous transmissions into the simulated channel, start or stop collecting certain types of statistics, or any other desired functions.

During the course of the simulation, the analysis and storage workstation 140 may collect "traces" of some or all of the packets that are transmitted across the testbed network 120 [step 655]. It can do so, for example, via standard packet-sniffing techniques or any other conventional technique. Such traces can be displayed in real-time, analyzed, and/or stored for later analysis. The nodes 135-1 to 135-N themselves may also collect, locally in memory or on storage media within the nodes, information about how the node is performing, performance statistics, start and stop times for various protocol interactions, and so forth [step 660].

At the completion of the simulation, the analysis and storage workstation 140 may collect information from some or all of the nodes 135-1 to 135-N being tested [step 665]. The analysis and storage workstation 140 may collect this information via file transfer protocols, the Simple Network Management Protocol, or any other conventional technique. This information can be displayed, analyzed, correlated, and/or stored for later use.

The above-described process provides the following improvements over conventional ad hoc protocol simulation techniques. It employs inexpensive and readily available components. It very accurately simulates actual network performance by incorporating real "devices in the loop." For example, a particular node may be an actual ad hoc network device with full protocol suites and application programs.

The process can be run in real-time, or even faster than real-time, unlike conventional modeling techniques that model a number of nodes and the communications channel on a single computer or small set of computers.

The process can readily emulate certain channel characteristics, such as node mobility across a terrain, localized jamming, time-varying fades, etc., that are difficult to emulate with simulations that employ coaxial cables to mimic RF channels. It allows repeatable experiments with quantifiable results. It organizes and stores experimental inputs and results in such a way that comparisons between different variants of a protocol, and/or different configuration settings for the protocols are simple.

CONCLUSION

Systems and methods consistent with the present invention provide a process by which ad hoc networking protocols may be quickly, repeatably, and accurately tested.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while a series of steps has been presented with respect to FIGS. 6A and 6B, the order of the steps may be altered in other implementations consistent with the present invention.

Moreover, while the above description focused on ad hoc networks, implementations consistent with the present invention are equally applicable to modeling and testing of application level protocols and systems. For example, the above-described ad hoc channel emulator could be modified to accurately represent connectivity through the global Internet, and the devices could employ, for instance, Domain Name Servers. Such a testbed would allow testing of new distributed Internet services, such as distributed web caches, under repeatable conditions in a laboratory rather than in the real Internet in the field.

The scope of the invention is defined by the following claims and their equivalents.

What is claimed is:

1. A system for testing protocols for a network having a plurality of network devices, comprising:
    a simulation controller configured to transmit network configuration information;
    one or more nodes, each node being configured to emulate at least one of the plurality of network devices and comprising:
        a traffic generator configured to generate, in response to the configuration information, traffic during the protocol testing, and
        an emulator configured to simulate transmission characteristics of the network; and
    an analysis device configured to monitor the one or more nodes during the protocol testing and analyze the monitoring,
    wherein the simulation controller is further configured to:
        transmit, prior to the protocol testing, a test scenario to each of the one or more nodes, the test scenario providing configuration information to the one or more nodes,
    wherein, when transmitting a test scenario, the simulation controller is further configured to:
        transmit information regarding at least one of a terrain, trajectory set, or a traffic control model to the one or more nodes, and
    wherein the simulation controller is further configured to:
        transfer, prior to transmitting the information, an indication of the terrain, trajectory set, and traffic control model to the analysis device.

2. The system of claim 1 wherein the network is an ad hoc network and each of the plurality of network devices is an ad hoc network device.

3. The system of claim 1 wherein, when transmitting network configuration information, the simulation controller is configured to:
    transfer, prior to the protocol testing, at least one script to each of the one or more nodes, the at least one script controlling functioning of each of the one or more nodes.

4. The system of claim 1 wherein, when transmitting network configuration information, the simulation controller is configured to:
    broadcast at least one characteristic matrix to the one or more nodes, the at least one characteristic matrix representing changing network transmission characteristics.

5. The system of claim 1 wherein, when transmitting network configuration information, the simulation controller is configured to:
    transmit stimuli to each of the one or more nodes, the stimuli causing the one or more nodes to cease operation, malfunction, begin erroneous transmissions, or start or stop collecting testing information.

6. The system of claim 1 wherein each of the one or more nodes is further configured to:
    receive, prior to emulating, software for the protocols and application programs associated with the at least one network device that the respective node is emulating.

7. The system of claim 1 wherein at least one of the one or more nodes is configured to:
    emulate two or more of the plurality of network devices.

8. The system of claim 1 wherein the one or more nodes are further configured to:
    collect, during the protocol testing, testing information, and
    transfer the testing information to the analysis device.

9. The system of claim 1 further comprising:
    a testbed network configured to transfer information between the simulation controller, the one or more nodes, and the analysis device.

10. A method for testing protocols for a network having a plurality of communication devices, the method comprising:
    selecting protocol configuration settings to be tested;
    establishing the protocol configuration settings in each of one or more nodes, each node being configured to emulate at least one of the plurality of communication devices;
    simulating operation of the network;
    broadcasting, during the simulating at least one characteristic matrix to the one or more nodes, the at least one characteristic matrix representing changing network transmission characteristics and being determined based on a terrain and a trajectory of the one or more nodes;
    monitoring the operation; and
    analyzing the monitoring to determine protocol suitability.

11. The method of claim 10 wherein the network is an ad hoc network and each of the plurality of network devices is an ad hoc networking device.

12. The method of claim 10 further comprising:
transmitting, prior to simulating, a test scenario to each of the one or more nodes, the test scenario including at least one of terrain, trajectory set, or traffic control model information.

13. The method of claim 10 further comprising:
receiving, prior to simulating, at least one script at each of the one or more nodes, the at least one script controlling functioning of the one or more nodes.

14. The method of claim 10 further comprising:
receiving, during the simulating, stimuli at the one or more nodes, the stimuli causing the one or more nodes to perform at least one of cease operation, malfunction, begin erroneous transmissions, or start or stop collecting testing information.

15. The method of claim 10 wherein the monitoring includes:
collecting via each of the one or more nodes, simulation information.

16. The method of claim 10 wherein the simulating includes:
simulating transmission of information between the plurality of communication devices according to the protocol configuration settings.

17. The method of claim 16 wherein the monitoring includes:
tracing the transmission.

18. The method of claim 10 wherein the simulating includes:
simulating operation of the network in one of real time or faster than real time.

19. A computer-readable medium containing instructions for controlling at least one processor to perform a method that tests protocols for a network having a plurality of communication devices, the method comprising:
establishing protocol configuration settings in each of a plurality of nodes, each of the nodes being configured to emulate at least one of the plurality of communication devices;
preparing a plurality of channel characteristic matrices to be broadcast to the plurality of nodes, the channel characteristic matrices representing changing network transmission characteristics and being generated based on a terrain and a trajectory of the plurality of nodes;
simulating operation of the network, the simulating including broadcasting the plurality of channel characteristic matrices to the plurality of nodes;
monitoring the operation; and
analyzing the monitoring to determine protocol suitability.

20. The computer-readable medium of claim 19 wherein the network is an ad hoc network and each of the plurality of communication devices is an ad hoc networking device.

21. The computer-readable medium of claim 19 further comprising:
receiving, prior to simulating, a test scenario at each of the nodes, the test scenario including terrain, trajectory set, and traffic control model information.

22. The computer-readable medium of claim 19 further comprising:
receiving, prior to simulating, at least one script at each of the nodes, the at least one script controlling functioning of the nodes.

23. The computer-readable medium of claim 19 further comprising:
receiving, during the simulating, stimuli at the nodes, the stimuli causing the nodes to perform at least one of cease operation, malfunction, begin erroneous transmissions, or start or stop collecting information.

24. The computer-readable medium of claim 19 wherein the monitoring includes:
collecting, via each of the nodes, simulation information.

25. The computer-readable medium of claim 19 wherein the simulating includes:
simulating transmission of information between the plurality of communication devices according to the protocol configuration settings.

26. The computer-readable medium of claim 25 wherein the monitoring includes:
tracing the transmission.

27. The computer-readable medium of claim 19 wherein the simulating includes:
simulating operation of the network in one of real time or faster than real time.

* * * * *